July 12, 1949.  E. P. BULLARD, III  2,476,238
PUMP AND MOTOR TRANSMISSION WITH FLUID PURIFIER
Filed March 23, 1943
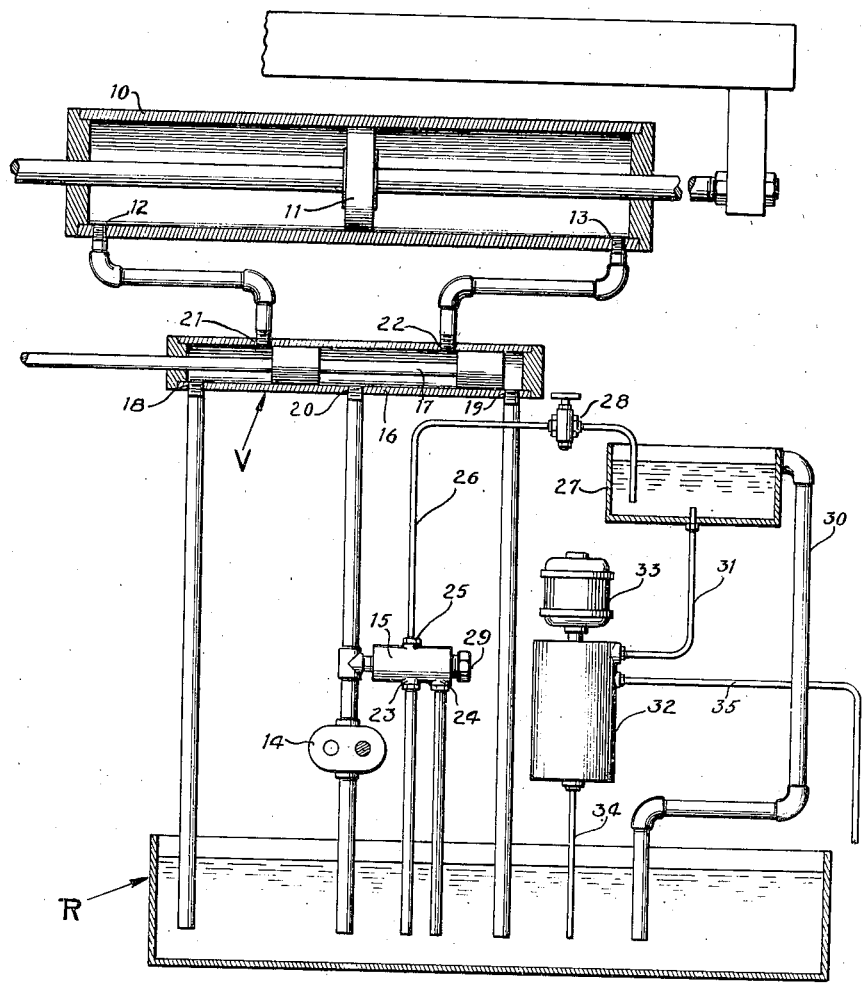
INVENTOR
Edward P. Bullard, III
BY
ATTORNEY

Patented July 12, 1949

2,476,238

UNITED STATES PATENT OFFICE 2,476,238

PUMP AND MOTOR TRANSMISSION WITH FLUID PURIFIER

Edward P. Bullard, III, Fairfield, Conn., assignor to The Bullard Company, a corporation of Connecticut Application March 23, 1943, Serial No. 480,177

3 Claims. (Cl. 60—52)

This invention relates to fluid systems including one or more fluid motors, and particularly to apparatus for maintaining such systems in condition to continuously function accurately.

Systems of the above-described type, particularly those in which the fluid employed is oil that is forced through relatively small orifices under great pressure during the normal operation of the systems, invariably perform irrationally with continued use, frequently stopping altogether. Upon disassembling such clogged systems, quantities of solid resins have been found, particularly in and around the orifices, valves and places of critical construction of the system.

The principal object of this invention is to overcome the above and other difficulties encountered in systems of the above-described type.

Other objects include, the provision of apparatus for preventing the clogging of fluid systems having small orifices through which oil under high pressure is adapted normally to pass; the provision of apparatus for eliminating the causes that tend to aid resinification of the oil of such systems; and the provision of apparatus including a centrifugal separator adapted continuously to be operated during the operation of the system for removing a relatively small portion of the oil, centrifuging the same and returning it to the system.

Other objects and novel features of the invention will become apparent from the following specification and accompanying drawing, in which the figure is a diagrammatic showing of a simple hydraulic system to which the principles of this invention have been applied.

The resinification of mineral oils in systems of the above-described type has been found to be aided by the presence in the oil of adulterants such as dust, water and other foreign matter. Heat also aids resinification of the oil, particularly when it is adulterated with water and dust.

Systems of the above-described type commonly employ filters or screens in the reservoir at the inlet to the pressure pump. Such devices fail to prevent the resinification of the oil for many reasons among which include the following. No filter or strainer will remove water from the oil. Filters and strainers will pass dust particles that are large enough to materially aid resinification of the oil. The use of a filter causes re-contamination of the oil since the latter is continuously passed therethrough in intimate contact with previously removed foreign matter. Filters and strainers become filled with foreign matter after continued use and tend to add foreign matter to the oil rather than to remove it therefrom.

It has been found that the removal of water, resins and fine dust particles (finer than those that can be removed by filters) from the oil of fluid motor systems causes them to function indefinitely with the same accuracy and reliability possessed by them when they were initially set up. This foreign matter has been effectively removed from the oil of such systems by withdrawing a portion of the oil, centrifuging the same and returning the centrifuged oil to the system. The centrifugal separator not only removes particles of dust that cannot be removed with a filter, but also removes all foreign matter adulterants having a specific gravity different from that of the oil, including water, the presence of which facilitates resinification of the oil. Although the total quantity of oil that passes through the system may be centrifuged before returning it to the system, it has been found that extremely satisfactory results may be obtained with a centrifugal separator that handles a relatively small portion of the system's capacity per hour and which is continuously operated during operation of the system. In one embodiment having a total capacity of approximately fifty to sixty gallons it has been found that only about four or five gallons per hour need be centrifuged continuously while the system is functioning.

Referring to the drawing which depicts a simple fluid-motor system embodying the principles of the invention, a cylinder 10 supports a piston 11 for relative movement. Inlet and exhaust ports 12 and 13 are located at each end of the cylinder 10. Liquid under pressure is adapted selectively to be supplied to ports 12 and 13 from a reservoir R by a pump 14 having a special relief valve 15, to be described later. The pump 14 delivers high pressure liquid to a regulating valve V which latter controls the flow of said fluid to the cylinder 10. The pressure of the liquid supplied depends upon the work to be done, and may vary between any limits. It has been found that systems employing working fluid under as much as 500 to 600 pounds per square inch pressure are materially aided by the method and apparatus of this invention.

The valve V comprises a housing 16 within which a spool valve 17 is adapted to be reciprocated. Opposite ends of the housing 16 are provided with ports 18 and 19, respectively, through which the exhaust from each end of cylinder 10 is adapted to pass in returning to the reservoir R. A port 20 located centrally of the housing 16 is connected to the pump 14 and the opposite ends of the spool of valve 17 straddle this port. Ports 21 and 22 are also provided in the housing 16 and are connected to the ports 12 and 13, respectively, of the cylinder 10. The construction and arrangement of ports 21 and 22 are such that port 20 is adapted, upon movement of valve 17, to supply high pressure liquid to either of the ports, but not both simultaneously. Additionally, when one of the ports 12 or 13 is being so supplied with pressure liquid, the other is in communication with its exhaust port 18 or 19. When it is desired to restrict the movement of piston 11 to a relatively slow rate, valve 17 is moved to a position where ports 21 and 22 are only partially open providing orifices through which the oil must pass at a rate commensurate with the desired rate of movement of piston 11. Accordingly, the ports 21 and 22 comprise orifices, the size of which may be varied at will.

The relief valve 15 is provided with two ports 23 and 24 that are in communication with the reservoir R. It also includes a port 25 that is connected to a pipe 26 leading to a container 27. A valve 28 is provided in pipe 26 for controlling the flow of liquid to container 27. A nut 29 is adapted to preload the relief valve mechanism 15 so that liquid under adequate pressure will be supplied to the valve V. The construction and arrangement of the valve mechanism are such that while piston 11 is moving, regardless of the rate, a definite pressure is maintained in pipe 26 to supply container 27 with liquid. When, however, valve 28 is closed and/or valve spool 17 is in position such that liquid flows to neither side of piston 11, the two ports 23 and 24 will by-pass the entire quantity of liquid delivered by pump 14.

The container is provided with an overflow pipe 30 leading to the reservoir R. The liquid in the container 27 gravitates through a pipe 31 to a centrifugal separator 32, driven by a motor 33, where it is treated and returned to the reservoir R through a pipe 34. The centrifugal separator is provided with the usual residue discharge 35 through which the water, dust particles and other adulterants removed from the oil are discharged. The amount of flow to container 27 through valve 28 may be any amount, even as small as about five or six percent of the system's capacity per hour.

Although the various features of the apparatus of this invention have been shown and described in detail to fully disclose one embodiment of the invention, it will be evident that numerous changes may be made in such details, and certain features may be used without others without departing from the principles of the invention. For example, should it be desired to centrifuge all of the oil in the system as it exhausts from the cylinder 10, it would be necessary only to connect ports 18 and 19 to a common pipe leading to the container 27, and to employ a centrifugal separator having the capacity of the exhausted oil.

What is claimed is:

1. Apparatus comprising in combination, a cylinder; a piston within said cylinder; a reservoir for holding a supply of oil; a quantity of oil in said reservoir which during the normal operation of the apparatus becomes adulterated with foreign matter that aids resinification of the oil under continued use at relatively high pressures and/or temperatures; a pump for supplying said oil at a relatively high pressure to said piston; a valve mechanism for controlling the flow of oil to and from said cylinder, having orifices through which said oil passes under high pressure; a centrifugal separator; means for continuously supplying a relatively small quantity of oil from said system to said centrifugal separator while said apparatus is in operation for removing from said oil the foreign matter tending to aid resinification thereof; and means for returning the centrifuged oil from said centrifugal separator to said apparatus.

2. In a fluid-operated system, a piston and a cylinder; a reservoir; oil within said reservoir which during the normal use of the system becomes adulterated with foreign matter that aids resinification of the oil under continued use at relatively high pressures and/or temperatures; means for supplying oil under pressure from said reservoir to said piston and cylinder; means for exhausting oil from said cylinder; a centrifugal separator for removing the foreign matter from said oil that tends to aid resinification thereof; means for delivering a quantity of said oil to said centrifugal separator; and means for returning said quantity of oil after it has been centrifuged by said centrifugal separator to said system.

3. A system comprising in combination; a piston and cylinder; a reservoir for oil; oil in said reservoir which during normal use of the system becomes adulterated with foreign matter that aids resinification under continued use at relatively high pressures and/or temperatures; means for supplying said oil under relatively high pressures from said reservoir to said piston and cylinder; a regulating valve for controlling the flow of oil to said piston and cylinder; a centrifugal extractor for removing the foreign matter from said oil that tends to aid resinification thereof; means for supplying a portion of the oil from said system to said extractor; and means for returning the centrifuged oil to said system.

EDWARD P. BULLARD, III.

REFERENCES CITED

The following references are of record in the file of this patent:

UNITED STATES PATENTS

| Number | Name | Date |
| --- | --- | --- |
| 1,905,133 | Bishop et al. | Apr. 25, 1933 |
| 2,160,920 | Strawn | June 6, 1939 |
| 2,202,216 | Madsen | May 28, 1940 |
| 2,238,060 | Kendrick | Apr. 15, 1941 |
| 2,242,807 | Austin | May 20, 1941 |
| 2,268,653 | Flowers | Jan. 6, 1942 |

FOREIGN PATENTS

| Number | Country | Date |
| --- | --- | --- |
| 231,877 | Great Britain | Oct. 4, 1926 |